Patented Dec. 4, 1934

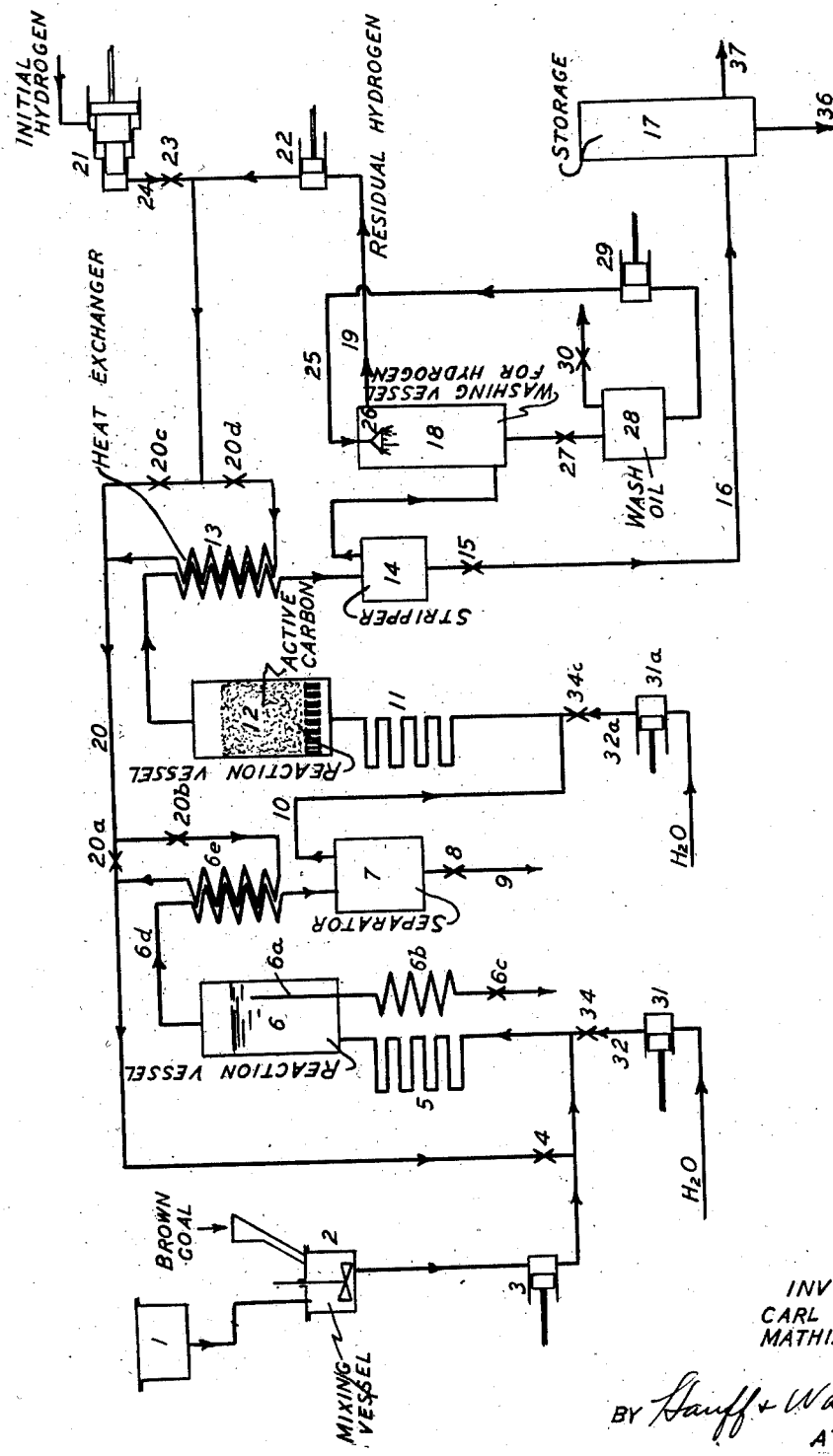

1,983,234

UNITED STATES PATENT OFFICE 1,983,234

CONVERSION OF SOLID FUELS AND PRODUCT DERIVED THEREFROM OR OTHER MATERIALS INTO VALUABLE LIQUIDS

Carl Krauch, Ludwigshafen-on-the-Rhine, and Mathias Pier, Heidelberg, Germany, assignors to Standard-I. G. Company, Linden, N. J., a corporation of Delaware Application July 29, 1932, Serial No. 625,650
In Germany February 14, 1925

18 Claims. (Cl. 196—53)

The present invention relates to the destructive hydrogenation of carbonaceous materials, and, in particular, to that process which is carried out in the presence of a catalyst immune to sulphur poisoning as described and claimed in our copending application Serial No. 86,646, of which this application is a continuation-in-part.

The object of our invention is to provide a catalyst which will act efficiently in the promotion of the conversion of carbonaceous substances into valuable liquids by destructive hydrogenation.

In our application Serial No. 86,646, it is stated that sulphides of metals including metals of the sixth group of the periodic system are suitable for use as catalysts immune to sulphur poisoning. Application Serial No. 181,885, which is a division of Serial No. 86,646, is drawn to cover heavy metal sulphides broadly and cobalt sulphide specifically. It is the utilization of sulphides of metals of the sixth group specifically as catalysts in the destructive hydrogenation process that constitutes the subject-matter of this application.

The sulphides contemplated by the present invention are the sulphides of chromium, molybdenum, tungsten and uranium and these sulphides may be added to the process, as such, or compounds of these metals which are capable of being converted into the sulphides by the sulphur in the material undergoing treatment or added sulphur may be used. We have found that these sulphides are suitable for use in this process either singly or in combination with each other or in combination with other materials; such as compounds of nitrogen, metals of the sixth group of the periodic system or compounds thereof, compounds of silver, copper, cadmium, lead, bismuth and tin, lithium oxide or carbonate, magnesite, boric acid, alumina, rare earths, oxides and carbonates of zinc, manganese and vanadium, oxides of the metals of the fourth group of the periodic system, and difficultly reducible oxides of the other metals. As compounds which are capable of being converted into sulphides mainly the oxides come into question, but also other compounds which are convertible into the sulphides, as for example the carbonates or the nitrates may be used for this purpose.

The said catalysts may be added in any suitable manner. They may be added to the solid or liquid material, or in the case of liquids they may be placed into the reaction vessel and the liquids brought into contact with them in a vaporized or otherwise finely divided state. Other bodies, for example, lumps of brick, quartz, asbestos, coke, active carbon, silica gel, metals, especially heavy metals, or metal oxides, or carbides, or mixtures of such bodies, may also be present in the reaction chamber. The said bodies have the effect of avoiding the formation of carbon deposits and of facilitating the distribution of the hydrogenating gas.

The catalysts may be rigidly arranged in the reaction vessel or they may be suspended in the materials to be treated in a finely dispersed state. In the latter case only small amounts of catalyst, as for example 0.02 per cent of molybdenum sulphide with reference to the dry coal to be converted are sufficient though also larger amounts may be employed. When working with rigidly arranged catalysts the material to be treated is simply passed thereover through the reaction vessel.

As regards the materials to be treated, the invention can be applied to any sort of solid fuel, for example, hard or soft coal, brown coal, lignite, peat, wood, or similar materials, mineral oils, shale oils, or other solid or liquid bitumina, also distillation or extraction products of all of them, such as tars obtained therefrom, whether by ordinary destructive distillation or by low temperature carbonization, or brown coal bitumen, or tars or oils obtained by pressure hydrogenation of solid or liquid fuels, or components or conversion products of all the above mentioned materials such as cracked products, cumarone or any other resins or residues of their distillation, pitch, asphaltum and so on, or mixtures of several such products with each other, also of solids with the above-named liquids or of one or more of such products with other suitable organic liquids.

Especially when employing coal or liquid fuels, an addition of lignite or peat is often of advantage, often increasing the hydrogenizing action, avoiding several drawbacks and in the case of solid substances rendering their introduction easier. All the said materials may be used in the presence of substantial amounts of water and, if desired, water may be added as such. Sometimes the process of hydrogenation is hereby furthered. For example, lignite producer tar containing from 40 to 50 per cent of water may be used to advantage directly. The addition of water, which is preferably employed in an amount of about 10 per cent by weight of the carbonaceous materials to be introduced into the reaction vessel, has the effect of reducing the partial pressure of the oils whereby a more effective hydrogenation may take place.

The preferred form of carrying out the process is generally a continuous operation with a stream of the gases and with an excess thereof over the required quantity and preferably while maintaining the desired pressure by adding fresh gas and passing the gas either by circulation through one or more reaction vessels or through a succession of several reaction vessels. The material to be converted is supplied at a proper place and the products are separated from the reaction gases by cooling.

We further discovered that the process according to the present invention is in many cases, and in particular when converting solid fuels or heavy oils or residues, greatly improved by carrying out the process in two parts or stages. In the first stage the coal, tars or heavy petroleum products are converted into liquids poor in fractions of low boiling point by liquefaction or destructive hydrogenation with or without catalysts, while in the second stage the products of stage one are transformed into hydrocarbons of low boiling point, by destructive hydrogenation, but preferably with the aid of catalysts. Increased pressure is preferably employed in one or both stages. Insofar as catalytic masses are added in both stages, they may be of the same kind or different in quantity, concentration or kind. The two stages can be effected in two separate or adjoining reaction vessels or in different parts of a single vessel constructed in a suitable manner. Even more than two stages may be employed successively in certain cases.

The gases serving for the reaction may consist of hydrogen alone or of mixtures containing hydrogen, for example a mixture of hydrogen with nitrogen, or water gas, or hydrogen mixed with carbon dioxide, hydrogen sulphide, water vapour or methane or other hydrocarbons. Or the hydrogen may be generated in the reaction chamber by the interaction of water and carbon monoxide and by similar reactions. When employing nitrogen compounds as catalysts, and carbon monoxide and water, the gas must be employed in a stream.

The process is best carried out under elevated or even strongly elevated pressure and most suitably with a stream of the gas passed through or over the material to be treated or carrying it along through the reaction vessel by which method the production obtained by the process is very large.

Depending on the conditions of working, for example, temperature and pressure employed or duration of the treatment, the products are poor or rich in products of low boiling point. Generally the temperature ranges between 300 and 700° C., and the pressure, when used, should amount to at least 20 atmospheres, and should, preferably, be much higher up to about 2000 atmospheres.

The conversion according to the present invention is preferably carried out in vessels constructed of or lined with highly alloyed steels, such as chromium steel or chromium nickel steel.

In the following examples, the time of reaction varies considerably, as might be supposed, depending on the nature of the raw material, the activity of the catalyst, temperature, pressure and the like. In practice it is desirable to make a few preliminary runs in order to determine the time required for the best yields under a given set of conditions. Generally speaking, with batch operations the total time may be from two to ten hours or more, depending on the yield desired, while with continuous operations the time is usually shorter. When continually feeding liquid or difficultly vaporizable oils, the rate of flow may be in the neighborhood of .3 to .8 volume of oil per hour per volume of reaction space. Vaporous materials may be treated at higher temperatures and the feed rate may consequently be one or even one and one-half volumes per hour per volume of reaction space. The volume of hydrogen may likewise vary considerably and should always, of course, be in excess of that actually required for the conversion, for example, the rate of flow of hydrogen may be in excess of about 600 litres per kilogram of carbonaceous material.

A suitable arrangement of apparatus for carrying out the process is illustrated in the accompanying drawing. The process may be further described with reference thereto.

Finely ground brown coal is pasted in the mixing vessel 2 with oil from the tank 1 and the mixture is thereafter forced by means of pump 3 together with hydrogen which is supplied from conduit 20, through the pre-heater 5, into the reaction vessel 6. The regulation of the amount of hydrogen necessary for the conversion is effected by means of valve 4. The liquid residues from the reaction vessel 6 are removed through draw-off pipe 6a, their temperature reduced in cooler 6b and their pressure reduced by expansion through valve 6c. The gaseous and vaporous products from the reaction vessel 6 are removed by way of pipe 6d and heat exchanger 6e. By-passed entering hydrogen may be conducted through heat exchanger 6e, the rate of flow and the amount of such hydrogen being regulated by valves 20a and 20b. By suitably regulating the flow of hydrogen through the heat exchanger 6e, the heavier products (lubricating oil, washing oil, impregnating oil, etc.) from the reaction vessel 6 can be condensed and separated in separator 7, from which they can be removed through expansion valve 8 and pipe 9, the uncondensed gases and vapors being removed through pipe 10, or the gases and vapors from pipe 6d may be passed through exchanger 6e and separator 7 without condensation. The gases and vapors from pipe 10 are further heated in coil 11 and are then conducted into a second vessel 12 which contains molybdenum sulfide. The distilled reaction products give off their heat in the heat exchanger 13 to the entering hydrogen, controlled by valves 20c and 20d, and are thereby condensed. The obtained low boiling products are released from the stripper 14 through valve 15 and are conducted into a supply tank 17 by means of a conduit 16, whereas the hydrogen is conducted into the washer 18 and is there freed from the gaseous hydrocarbons with the assistance of oil. The oil is introduced into the upper part of the washer by means of conduit 25, sprayed through a nozzle 26, and again drawn off on the bottom. The oil is released through valve 27 into a receiver 28, from which the dissolved hydrocarbons escape through conduit 30. The oil is drawn off by means of pump 29, compressed and returned into the washer. The purified hydrogen leaves the washer through conduit 19 and is re-introduced into the system by the rotating pump 22 through conduit 20. Fresh hydrogen, compressed by means of compressor 21, may be introduced through conduit 24, the amount of such hydrogen being regulated by valve 23.

In case a catalyst is used in the first step, the addition is preferably made in the mixing vessel 2.

In case the conversion is to be made in the presence of water vapor, water is introduced by means of pumps 31 and 31a respectively, through conduit 32, into the reaction vessel 6, or through conduit 32a into the second reaction vessel 12. The regulation of the necessary amount of water is effected by means of valves 34 and 34a respectively. The water evaporates in the coils 5 and 11, is condensed behind the reaction oven in the heat exchanger 13 and collected at the bottom of tank 17. From there it may be drawn off through conduit 36, whereas the benzine is removed through an opening 37 positioned at a higher level in the tank.

The following examples will serve to further explain how our invention is carried out in practice, but we do not restrict our invention to these examples.

Example 1

Brown coal is intimately mixed with 1 per cent its weight of molybdenum sulphite and introduced into a vessel capable of withstanding high pressure, in which it is treated at about 500° C. and under a pressure of 150 atmospheres with a stream of hydrogen. The coal is soon and nearly completely transformed into valuable thin hydrocarbons.

Example 2

Brown coal tar obtained in a gas producer fed with brown coal, is vaporized at a temperature of 500° C. and under a pressure of about 150 atmospheres, in a current of hydrogen, and the mixture is continuously passed over a contact mass consisting of a mixture of molybdenum sulphide with an addition of 20 per cent its weight of aluminium hydroxide. The gas is pumped round in a circular way while maintaining the pressure by an addition of fresh hydrogen, and separating the material by cooling. There is formed a mobile and nearly colourless product free from phenols, without any formation of coke, asphalt or other residue. From thirty to fifty per cent of the product distil up to 150° C., and the fractions up to 300° C. are colourless and fully saturated. At 350° C. only a small residue is left having a vaseline-like nature. The raw product can be used as a motor fuel or for manufacturing lubricating oils. An addition of say 1 per cent of ammonia to the hydrogen is also useful.

A mixture consisting of 75 per cent, by volume, of hydrogen and 25 per cent of nitrogen may also be used, preferably at a pressure of 200 atmospheres.

Example 3

Raw cresylic acid obtained from coal tar is passed along with a current of hydrogen over tungsten sulphide under a pressure of 50 atmospheres and at a temperature of about 500° C. to 550° C. whereby it is rapidly and completely converted into hydrocarbons.

Example 4

Petroleum residues when treated as described in the foregoing example yield in a continuous manner and without any formation of coke or asphaltum, at between 450° and 500° C., a product containing from 50 to 80 per cent of benzine boiling up to 150° C.

Example 5

Dark-coloured residues of an American rock oil which at ordinary temperature are nearly solid and have a strongly unsaturated character, are incorporated with hydrogen and passed continuously under a pressure of 200 atmospheres and at from 450° to 500° C. over a catalyst prepared by forming chromium sulphide. A light-coloured, thin liquid is produced besides a little methane which on distillation yields 50 per cent of a fraction up to 150° C. and additional 35 per cent up to 350° C., all of a saturated character. The small residues are thick or vaseline-like and free of pitch.

Example 6

Brown coal producer tar is continuously passed, together with a current of oxygen, under a pressure of 800 atmospheres and at a temperature of about 500° C. over a catalyst consisting of porous material coated with uranium sulphide. The product obtained consists of up to about 50 per cent of gasoline.

A catalyst containing a mixture of uranium and tungsten sulphides, may also be used.

Example 7

2 parts of lignite producer tar are mixed with 1 part (by weight) of raw lignite or peat and continuously forced into a high pressure vessel and treated therein with hydrogen under a pressure of 200 atmospheres and at about 450° C. or higher, but not exceeding 600° C. while providing for an intimate contact of gas and material by employing a rapid current of gas, stirring or the like. The gas mixture leaving the vessel is cooled by exchange of heat with the freshly entering gases. A thin hydrocarbon product with about 25 per cent of a gasoline fraction is obtained, the high boiling fractions of which may be subjected to a repeated treatment or utilized in any other manner, for example, for the production of lubricating oils or solvents or washing means or impregnating oils or insulating oils. The hydrogen is pumped around while the residue containing ashes and mostly a little carbon is slowly discharged as a paste. The gas current may be so rapid that the gases of the reaction carry enough of the products to be subjected to a second or even third or more treatments in subsequent vessels. If in the second vessel a catalyst containing molybdenum sulphide is employed, over which the reaction gases pass at about 500° C., a product with 50 per cent of a petrol fraction is readily obtained with a complete reduction of phenolic bodies and an extensive removal of sulphur.

An addition may be made to the starting material of roasted pyrites or other contact bodies.

Our invention is not confined to the above examples, the conditions may be widely varied in various directions. For example, the pressures and temperatures may be higher or lower than stated above.

In the appended claims, the expression "distillation and extraction products thereof" is intended to relate only to solid and liquid distillation and extraction products and is not to be construed to include normally gaseous products of the distillation of solid and liquid fuels.

What we claim is:—

1. The process of destructively hydrogenizing carbonaceous substances, such as solid and liquid fuels, distillation and extraction products thereof, which comprises treating them with hydrogen in the presence of a sulphide of a metal of the sixth group of the periodic system, and heat at a temperature between about 300° and 700° C., sufficient to promote the reaction and at a pressure of at least 20 atmospheres.

2. The process of destructively hydrogenizing carbonaceous substances, such as solid and liquid fuels, distillation and extraction products thereof, which comprises treating them with hydrogen in the presence of a sulphide of a metal of the sixth group of the periodic system, and heat at a temperature between about 300° and 700° C. sufficient to promote the conversion and at a pressure of at least 20 atmospheres, the conditions of working, such as temperature, pressure and the efficiency of the catalyst, being so adapted to each other as to give rise to the formation of substantial amounts of low boiling hydrocarbons of a benzine character.

3. The process of destructively hydrogenizing carbonaceous substances, such as solid and liquid fuels, distillation and extraction products thereof, into valuable liquids, which comprises treating them with a stream of hydrogen in the presence of a sulphide of a metal of the sixth group of the periodic system, and heat at a temperature between about 300° and 700° C., sufficient to promote the conversion and at a pressure of at least 20 atmospheres.

4. The process of destructively hydrogenizing carbonaceous substances, such as solid and liquid fuels, distillation and extraction products thereof, which comprises treating them with hydrogen in the presence of a pre-formed sulphide of a metal of the sixth group of the periodic system, and heat at a temperature between about 300° and 700° C., sufficient to promote the reaction and at a pressure of at least 20 atmospheres.

5. The process of destructively hydrogenizing carbonaceous substances, such as solid and liquid fuels, distillation and extraction products thereof, which comprises treating them with hydrogen, in the presence of a sulphide of a metal of the sixth group of the periodic system, and of a substantial amount of water, and heat at a temperature between about 300° and 700° C., sufficient to promote the reaction and at a pressure of at least 20 atmospheres.

6. The process of converting carbonaceous substances, such as solid and liquid fuels, distillation and extraction products thereof, into valuable liquids, which comprises treating them with hydrogen, in the presence of a sulphide of a metal of the sixth group of the periodic system, and heat at a temperature of between about 300° and 700° C. and at a pressure of at least 50 atmospheres.

7. The process of converting carbonaceous substances, such as solid and liquid fuels, distillation and extraction products thereof, into valuable liquids, which comprises treating them with hydrogen, in the presence of a pre-formed sulphide of a metal of the sixth group of the periodic system, and heat at a temperature of between about 300° and 700° C. and at a pressure of at least 20 atmospheres.

8. The process of converting carbonaceous substances, such as solid and liquid fuels, distillation and extraction products thereof, into valuable liquids, which comprises treating them with hydrogen, in the presence of a sulphide of a metal of the sixth group of the periodic system and of a substantial amount of water, and heat at a temperature of between 300° and 700° C., and at a pressure of at least 50 atmospheres.

9. The process of producing liquids from solid fuel materials, which comprises destructively hydrogenating the initial material, in the presence of a sulphide of a metal of the sixth group of the periodic system, at a pressure of at least 20 atmospheres and at a temperature of between about 300° and 700° C.

10. The process of producing liquid hydrocarbons from lignite, which comprises destructively hydrogenating the initial material in the presence of a sulphide of a metal of the sixth group of the periodic system, at a pressure of at least 20 atmospheres and at a temperature of between about 300° and 700° C.

11. The process of converting carbonaceous substances, such as solid and liquid fuels, distillation and extraction products thereof, into valuable liquids, which comprises treating them with a continuous stream of hydrogen and a substantial amount of water and heat at a temperature of between about 300° and 700° C. and at a pressure of at least 50 atmospheres in the presence of a sulphide of a metal of the sixth group of the periodic system.

12. The process of converting carbonaceous substances, such as solid and liquid fuels, distillation and extraction products thereof, into valuable liquids, which comprises treating a mixture of one of said substances with another of said substances of more recent geological age than the first by destructive hydrogenation in the presence of a sulphide of a metal of the sixth group of the periodic system, under a pressure of at least 20 atmospheres and at a temperature of between about 300° and 700° C.

13. The process of destructively hydrogenizing carbonaceous substances, such as solid and liquid fuels, distillation and extraction products thereof, into valuable liquids, which comprises first treating them with hydrogen at a pressure of at least 20 atmospheres and with heat at a temperature between about 300° and 700° C., sufficient to promote the conversion until products poor in fractions of low boiling point are obtained and then in a further stage converting the heavier fractions of such products alone into products rich in fractions of low boiling point by a further treatment with hydrogen at a pressure of at least 20 atmospheres and heat at a temperature between about 300° and 700° C., sufficient to promote the conversion, in the presence of a sulphide of a metal of the sixth group of the periodic system.

14. The process of destructively hydrogenizing carbonaceous substances, such as solid and liquid fuels, distillation and extraction products thereof, into valuable liquids, which comprises treating them with hydrogen in the presence of a sulphide of a metal of the sixth group of the periodic system, at a temperature between about 300° and 700° C., sufficiently high for the conversion and at a pressure of at least 20 atmospheres for a period such that, under the conditions as above given, the product is substantially free from asphalt.

15. The process of destructively hydrogenizing carbonaceous substances, such as solid and liquid fuels, distillation and extraction products thereof, containing asphaltic hydrocarbons, into valuable liquids which comprises treating them with hydrogen in the presence of a sulphide of a metal of the sixth group of the periodic system, at a temperature between about 300° and 700° C., sufficiently high for the conversion and at a pressure of at least 20 atmospheres for a period such that, under the conditions as above given, the product is substantially free from asphalt.

16. The process of destructively hydrogenizing carbonaceous substances, such as solid and liquid fuels, distillation and extraction products thereof, into valuable liquids which comprises treating them with added hydrogen, and a catalyst containing a sulfide of a metal of the sixth group of the periodic system, and heat at a temperature sufficient to promote the conversion and elevated pressure of at least 50 atmospheres.

17. The process of converting carbonaceous substances, such as solid and liquid fuels, distillation and extraction products thereof, into valuable liquids which comprises treating them with an excess of hydrogen at a temperature between about 300° and 700° C. in the presence of molybdenum sulphide.

18. The process of converting carbonaceous substances, such as solid and liquid fuels, distillation and extraction products thereof, into valuable liquids which comprises treating them with hydrogen at a temperature of between about 300° and 700° C. and at a pressure of at least 20 atmospheres in the simultaneous presence of molybdenum sulphide and ammonia.

CARL KRAUCH.
MATHIAS PIER.